Dec. 19, 1933.   E. McADAM   1,940,138
SOAP DISPENSER
Filed Oct. 8, 1932
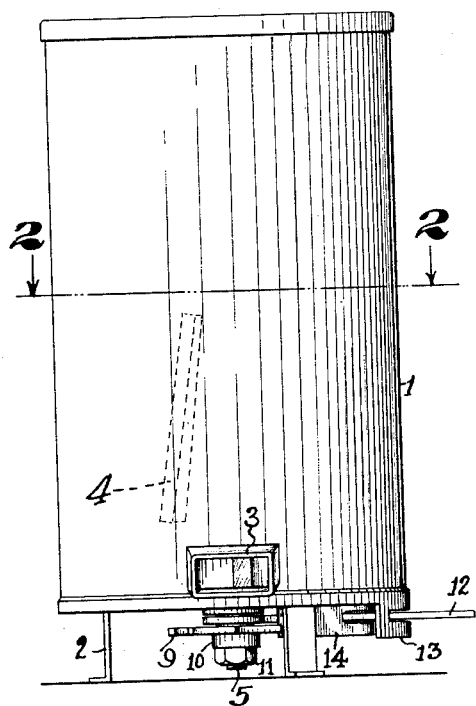
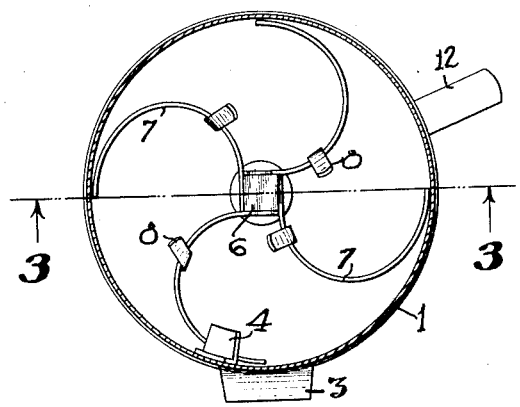
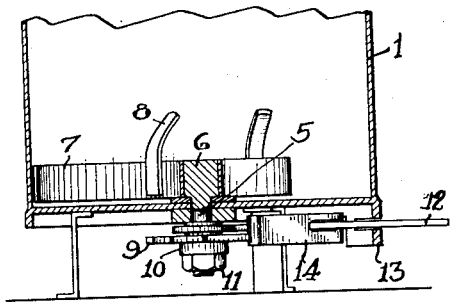
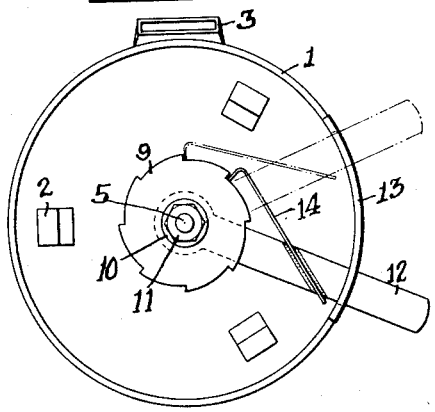
INVENTOR,
Edward McAdam
BY J. E. Trabucco
ATTORNEY Patented Dec. 19, 1933

1,940,138

UNITED STATES PATENT OFFICE 1,940,138

SOAP DISPENSER

Edward McAdam, Mill Valley, Calif.

Application October 8, 1932. Serial No. 636,781

5 Claims. (Cl. 221—94)

This invention relates to improvements in soap dispensers.

An object of my invention is to provide an improved soap dispenser having novel distributing means which is both simple in construction and convenient in operation.

Another object of my invention is to provide an improved soap dispenser having manually operated distributing means which causes only certain quantities of soap to be dispensed at one operation.

Other objects more or less apparent will present themselves or will be specifically pointed out in the description to follow.

In the accompanying drawing:

Fig. 1 is an elevation of a soap dispenser constructed in accordance with my invention;

Fig. 2 is a section taken on the line 2—2 of Fig. 1;

Fig. 3 is a section taken on the line 3—3 of Fig. 2, showing a fragmentary part of the container; and Fig. 4 is a bottom plan view of the dispenser.

Referring to the drawing the numeral 1 designates a cylindrical container having a number of supporting legs 2 depending from its closed bottom side. Located in a side wall of the container immediately above the bottom thereof, is an opening for the passage of quantities of semi-liquid soap from the inside of the said container. Suitably secured to the side wall of the container at points around the opening therein is a chute 3 which is adapted to carry the soap to a point where it is readily available for use. Extending from a side wall of the container is a baffle plate 4 which serves to prevent the semi-liquid soap in the container from rotating with the dispensing means.

Extending upwardly through the center of the container's bottom is a short shaft 5 having a square-shaped enlarged part 6 on its upper end. Secured to the sides of the enlarged part 6 are four outwardly extending curved blades 7, the free ends of which are located adjacent the side walls of the container. The blades are preferably of semi-circular shape and are of approximately the same width as the height of the opening in the side wall of the container. The blades each carry upwardly projecting curved bars 8 which serve as means for agitating the soap so it will readily drop downwardly onto the bottom of the container.

Suitably keyed to the lower end of the shaft 5 is a ratchet 9 having a number of spaced teeth distributed evenly around its outer edge. A washer 10 is mounted on the shaft beneath the ratchet, and a nut 11 screwed onto the end of the said shaft serves to maintain the said washer thereon. Loosely mounted on the shaft between two washers, is the hub of a lever member 12 which extends outwardly through a slot located in an arcuate projection 13 which depends downwardly from the side wall of the container. Secured to the lever member is a bar 14 having a hooked end which is adapted to engage with the teeth of the ratchet 9. When the lever member is manipulated toward the left the hooked end of the bar 14 engages with a tooth of the ratchet 9 and causes the latter to rotate a part of one revolution. The rotation of the ratchet imparts rotary motion to the shaft 5, which in turn causes the blades 7 to be carried in a clockwise direction. The slot in the arcuate depending projection 13 is preferably of such length as to permit the lever member to be moved sufficiently to cause the discharge of but a certain amount of soap through the chute 3.

While the dispenser herein shown and described constitutes the preferred embodiment of my invention, it is to be understood that various changes may be made in regard to the form and details of construction without departing from the spirit of the invention. For this and other apparent reasons I desire my invention included broadly within the spirit of the appended claims.

Having described my invention what I claim is:

1. A dispenser comprising a container having a bottom and an opening in its side wall above the bottom, a shaft rotatably extending through the center of the bottom, a plurality of curved blades extending from and secured to the shaft with ends thereof positioned adjacent the side wall of the container, the said blades being adapted to successively cause the discharge of a certain quantity of a material through the opening in the container, upon rotation of the shaft.

2. A dispenser comprising a container having a bottom and a discharge opening in its side wall above the bottom, a rotatable shaft extending through the bottom, means externally of the container for rotating the shaft, a plurality of curved blades extending in different directions from the shaft, the said blades being positioned so their ends alternately close the discharge opening in the container, and a plurality of upright members carried by the blades.

3. A dispenser comprising a cylindrical container having a discharge opening in its side wall, a plurality of oppositely disposed curved blades secured to and extending from a shaft axially disposed in the container to points adjacent the side wall of the container, the said blades being adapted to alternately eject certain quantities of material through the discharge opening when the shaft is rotated, and means for rotating the shaft.

4. A dispenser comprising a cylindrical container having a discharge opening in its side wall, a shaft axially disposed in the container, a plurality of curved blades secured to the shaft and extending in opposite directions to points adjacent the side wall of the container, the outwardly disposed ends of the blades being adapted to alternately register with the discharge opening when the shaft is rotated, a ratchet secured to the shaft, and a lever having means engaging with the ratchet whereby the ratchet, shaft and blades may be rotated by manipulating the lever.

5. A dispenser comprising a cylindrical container having a closed lower end and a discharge opening in its side wall, a shaft axially disposed in the container, a plurality of blades secured to and extending in different directions from the shaft with their ends positioned adjacent the side wall of the container, the said blades being adapted to successively cause the discharge of a material located in the container through the opening in the side wall upon rotation of the shaft, operating means for the shaft, and means for confining the movement of the said operating means within certain limits.

EDWARD McADAM.